United States Patent [19]
Pedersen

[11] 3,875,033
[45] Apr. 1, 1975

[54] METHODS FOR PRODUCING ANHYDROUS HYDRAZINE
[76] Inventor: George C. Pedersen, 155 Hillside Dr., Orchard Park, N.Y. 14127
[22] Filed: Apr. 6, 1973
[21] Appl. No.: 348,536

[52] U.S. Cl.................. 204/157.1 H, 204/157.1 R
[51] Int. Cl............................................... B01j 1/10
[58] Field of Search............... 204/157.1 H, 157.1 R

[56] References Cited
UNITED STATES PATENTS
2,736,693  2/1956  Gunning et al. .............. 204/157.1 R
3,542,659  11/1970  Gaussens ..................... 204/157.1 H Primary Examiner—Howard S. Williams
Attorney, Agent, or Firm—Mandeville and Schweitzer

[57] ABSTRACT

Methods are provided for producing anhydrous hydrazine by irradiating liquid ammonia from a source of radiation energy in a reaction zone. The reaction is carried out in the presence of a second material, which serves simultaneously to intercept H radical produced by such reaction and prevent the reaction thereof with the product, and as a secondary source of the product. The second material is a monohaloamine, a dihaloamine, a trihaloamine, or mixtures of all three ammonia derivatives of a single halogen.

11 Claims, No Drawings

METHODS FOR PRODUCING ANHYDROUS HYDRAZINE

STATEMENT OF THE INVENTION

Generally speaking, this invention relates to methods for producing hydrazine. More particularly, this invention relates to an improved method for producing anhydrous hydrazine from liquid ammonia, which results in a much higher percentage production of the product from a specific quantity of starting materials and a specific amount of radiation energy utilized, by incorporating into the reaction zone a second material which serves the dual function of controlling the H radical produced from such reactions, thus preventing it from reacting with the product and reducing the quantity of the product achieved; and secondly, it serves to provide an additional source of the product itself.

BACKGROUND OF THE INVENTION

As is well known, hydrazine has become a very important chemical in the last few years, because it has become valuable as a component in a variety of important uses. For example, hydrazine is one of the important chemicals utilized in the development of a number of new bio-chemicals. Moreover, it is one of the primary components contained in certain rocket fuels developed in recent years. In addition, it has become important as a reducing agent in a variety of different applications.

Because of its appropriateness in these various applications, the demand for hydrazine has become extensive. However, it is extremely expensive to produce in known procedures because of the difficulties in obtaining the hydrazine product in quantities which would make the chemical appropriate for standard commercial enterprises. That is, the percent quantity produced of the product hydrazine from the starting materials is so small that the cost of the hydrazine is excessive for routine applications. Moreover, generally the product is produced in a hydrated form which requires rigid and complicated procedures in order to produce the desired anhydrous product.

STATEMENT OF THE PRIOR ART

Attempts have been made to overcome these difficulties in low yield of product, including the decomposition of both liquified and gaseous ammonia in a reaction zone exposed to a source of ionizing radiation. Whereas, such procedures have served to increase the yield of hydrazine produced, the percentage yields still are not high enough to provide a product which may be utilized on a routine commercial basis. The reason for this is the fact that the resulting hydrazine produced by such reactions is at least partially destroyed by hydrogen atom attack. That is, such reactions result in activated ammonia molecules which yield amino radicals ($NH_2$) and hydrogen atoms. Hydrazine molecules result from the union of pairs of amino radicals, but the yields are low because this reaction between the amino radicals must compete with the re-formation of ammonia by reaction of an amino radical with a hydrogen atom and by reaction of hydrazine with hydrogen atoms or other radicals. Such reactions are as follows:

$$NH_3 \rightarrow NH_2 + H \quad (1)$$

$$NH_2 + NH_2 \rightarrow N_2H_4 \quad (2)$$

$$H + N_2H_4 \rightarrow H_2 + N_2H_3 \quad (3)$$

Thus, the problem arises that in order to utilize the appropriate advantages of ionizing radiation in the production of hydrazine, it becomes necessary to control the related H radical produced, so that the latter does not attack the product and bring about a decomposition reaction thereof. Certain attempts have been made to control the H radical by incorporating into the reaction zone a second component which serves as an interceptor or scavenger for the H radical. That is to say, compounds are included in the reaction zone initially, which are capable of preferentially collecting the atoms of hydrogen or free electrons which would ordinarily attack the hydrazine product produced, and thus reduce yields. With such arrangements, increased product yield is achieved, but still not on a basis which provides a product yield which is commercially advantageous on a routine basis.

SUMMARY OF THE INVENTION

With this invention, by contrast, product yields of hydrazine are produced by exposing liquid ammonia in a reaction zone to a source of radiation energy to produce product yields having a G value within the range of between about 5 and 20. The G value is the measure of yield in terms of the quantity of radiation energy required to produce a particular amount of product yield. It is measured in molecules of product produced per 100 electron volts of energy deposited in the samples during the reaction.

The above is achieved by incorporating into the reaction zone a second material in the manner of the prior art described above, but which material serves not only as a "scavenger" or "interceptor" of the H radical produced by the decomposition reaction of ammonia exposed to radiation energy, but which second component also serves to provide an additional source of product. The second component is a halogen derivative of ammonia and may be a monohaloamine, a dihaloamine, or a trihaloamine, or mixtures of the three. Preferably, it will be monochloramine which may contain minor amounts of dichloroamine and trichloroamine. The additional quantities of amine radical present from the halogen derivative serve to combine with the ammonia and effectively control the free H radical to produce additional quantities of hydrazine product.

Whereas, it has been proposed to utilize anhydrous ammonia and chlorine to produce an intermediate reaction product of monochloramine, which in turn produces hydrazine in substantial quantities by chemical reaction of additional quantities of the ammonia in the reaction zone with the chlorine itself, the yield is not as high as desired, because of the requirement of additional quantities of ammonia in order to cause the reaction of those additional quantities of ammonia with the intermediate monochloramine product. The applicant here has discovered that by providing for the addition of monochloramine to liquid ammonia in the reaction zone initially, that amine to amine linkages are produced from the monochloramine in the presence of a source of radiation energy while the monochloramine simultaneously provides effective control of H radical attack on the product produced.

Before describing this invention in more detail, it may be well to note that this invention has been found applicable to the utilization of a wide variety of sources of radiation energy including, for example, radiation produced by electron bombardment from a Van de Graff generator, the kinetic energy produced from fission fragments evolving from nuclear reactions, as well as actinic radiation produced from ultraviolet radiation, X-rays and gamma rays. Radiation in the form of electrons is appropriate in most applications because it can be more easily controlled for the purposes of determining yield in relationship to radiation energy utilized (the G value).

DESCRIPTION OF THE PREFERRED EMBODIMENT OF THE INVENTION

A preferred cycle of operation for carrying out the invention, in accordance herewith, includes selecting a reaction vessel of a size within the range of between about 1½ and 3 times the volume of the combined initial reactants to be utilized in the reaction in accordance herewith, and preferably two times the volume of the combined initial reactants. The combined initial reaction mixture will be liquid ammonia and a second component selected from the group consisting of monohaloamines, dihaloamines, trihaloamines, or mixtures of all three ammonia derivatives of a single halogen. Preferably, the second component will be monochloramine with minor amounts of di and/or tri chloroamine.

The amount of the second material utilized in the combined reaction mixture initially will be within the range of between about 0.15 – 0.30 moles/liter of the total quantity, and preferably about 0.23 moles per liter of the mixture. The temperature in the reaction vessel prior to beginning exposure will be within the range of between −30°C and −85°C, and preferably about −76°C. The energy utilized will be within the range of between about 0.5 and 1.5 MEV (million-electron volts), and, preferably, 1 MEV. The time of exposure will be within the range of between about 400 and 2,000 and, preferably 1,000 seconds.

Whereas, what actually takes place in the reaction vessel in the presence of the radiation energy cannot be specifically described, it can be theorized that the monochloramine controls the liberated H radical by reactions between the two being generally expressed as follows:

$$NH_2Cl + H \rightarrow NH_3 + Cl \quad (4)$$

$$NH_3 + Cl \rightarrow NH_2 + HCl \quad (5)$$

The $NH_2$ product of this reaction is reacted with a further quantity of the $NH_2Cl$ to produce hydrazine, and a chloride radical according to the reaction $$NH_2Cl + NH_2 \rightarrow N_2H_4 + Cl \quad (6)$$

The chloride radical is then reacted with ammonia present in the reaction vessel to produce $NH_2$ and HCl according to the reaction (5) above, and the $NH_2$ thereby produced is reacted with $NH_2Cl$ according to the reaction (6) above. Thus, it can be seen that the reactions noted above are chain reactions, and serve to tie up the H radical to produce $NH_2$ radicals and hydrazine.

Moreover, it can be theorized that the hydrogen radical can be reacted with the $NH_2Cl$ to produce $NH_2$ and HCl according to the reaction $$NH_2Cl + H \rightarrow NH_2 + HCl \quad (7)$$

The $NH_2$ radical so produced is then reacted with $NH_2Cl$ according to the reaction (6) noted above, the chloride radical produced thereby being reacted with ammonia according to the reaction (5) noted above.

Thus, by the reactions (5) and (7) noted above, each H radical reacts to form one amine or chloride radical, each chloride radical reacting to form one amine radical according to the reaction (6) noted above. Accordingly, each amine radical reacts to form one molecule of hydrazine plus one chloride radical, thus repeatedly and sequentially by reactions (5) and (6) providing a chain reaction for the formation of hydrazine.

Whereas, the above theoretical discussion cannot be entirely proved, the results achieved, in accordance herewith, of high G value yields prove that the reactions utilized herein are thermodynamically favorable, as opposed to prior art methods wherein an initial additional component in the reaction zone was utilized only to scavenge or control the H radical produced in the initial reaction. With the utilization herein of that additional component to provide the dual function of controlling the H radical produced so as to prevent its decomposition reaction with the hydrazine product, and as a source of additional quantities of amine radical to produce additional quantities of hydrazine, more product is achieved for the same energy utilized.

As purely illustrative of the results achieved, in accordance herewith, one may note the following example. It is to be understood, however, that this example is being presented with the understanding that it is to have no limiting character on the broad disclosure of the invention as generally set forth herein and as directed to men skilled in the art.

EXAMPLE

In this example, a representative mixture of the reaction components of liquified ammonia and monochloramine was prepared according to the procedures reported by Robert G. Laughlin, Chemitur-Zig/Chem. Appartur, 92, 1968, 11, pages 385–387. The reaction vessel had a volume of about 200cc. and the volume of the combined solution prepared as described above was about 100cc. The original solution tested at 0.23 ± 0.06 moles per liter as $NH_2Cl$. It should be understood that the initial solution probably contained minor amounts of di- and/or tri-chloroamine After the initial preparation as described in Laughlin, the solution was condensed into the reaction vessel. A Van de Graff generator was utilized to produce electrons as a source of energy with a current of 50 micro amps. and an energy of 1 MEV(million-electron volts). The time of each exposure was 1000 seconds. Two exposures were made and the quantity of the reaction product produced in the first exposure was 0.24 ± 0.03 moles per liter after the first irradiation, and 0.16 ± 0.03 moles per liter after the second irradiation.

An imprecise analysis of the lower limit of hydrazine production was made. In this connection, it should be understood that at least 90 percent hydrazine is expected to decompose. This factor was not included in the figures for the lower limit of hydrazine production. The amount of product produced was $4.6 \times 10^{20}$ molecules and the G value as about 0.5 using the calibration factor of $5 \times 10^{18}$ (ev/minute-micro-amps.).

As will be seen from the above example, the process, in accordance herewith, is effective for obtaining enhanced yields of hydrazine product by carefully utilizing a specific quantity of energy for producing under the same time and temperature conditions an increased amount of product.

Accordingly, and as will be apparent from the foregoing, there are provided, in accordance herewith, methods for producing enhanced yields of hydrazine utilizing thermodynamically favorable reactions, because an additional component is included in the reaction zone initially which not only serves to control the H radical so that it does not degrade the product produced, but also serves to provide an additional source of product, all in the same time period and with the same quantity of energy utilized.

That is, no additional energy is required in order to provide for this increased yield during the same period of time as would be the case if the additional component served only to scavenge the H radicals, as is the case in the prior art. Thus, the methods herein produce greatly enhanced yields making the product more readily available as a routine component for standard commercial operations.

While the methods herein disclosed form preferred embodiments of this invention, this invention is not limited to those specific methods, and changes can be made herein without departing from the scope of the invention which is defined in the appended claims.

What is claimed is:

1. A method for producing enhanced yields of anhydrous hydrazine, the steps which comprise placing a quantity of a reaction mixture comprising liquid ammonia and a second component in a reaction zone; said second component being selected from the group consisting of a monohaloamine, a dihaloamine, a trihaloamine and mixtures of all three ammonia derivatives of a single halogen; exposing said reaction zone to a source of radiation energy under time and temperature conditions effecting decomposition of said liquid ammonia to hydrazine product and H radical, and the reaction of said second component with said H radical to produce additional hydrazine product; and withdrawing said hydrazine product from said reaction zone.

2. A method as recited in claim 1, in which said source of radiation energy is electrons.

3. A method as recited in claim 2, in which said exposing step is carried out by the application of energy at the rate of within the range of between about 0.5 and 1.5 million-electron volts for a period of time within the range of between about 400 and 2,000 seconds.

4. A method as recited in claim 3, in which said exposing step is carried out by the application of energy at the rate of 1 million-electron volt for 1,000 seconds.

5. A method as recited in claim 1, in which said second component is selected from the group consisting of monochloramine, dichloroamine, trichloroamine and mixtures thereof.

6. A method as recited in claim 5, in which said second component is present in the amount of within the range of between about 0.15 and 0.30 moles per liter of said reaction mixture.

7. A method as recited in claim 6, in which said second component is present in the amount of about 0.23 moles per liter of said reaction mixture.

8. A method as recited in claim 1, in which said placing step is carried out at a temperature of about −76°C.

9. In a method for producing enhanced yields of anhydrous hydrazine; the steps which comprise placing a quantity of a reaction mixture comprising liquid ammonia and as the second component, a halogen derivative of ammonia in a reaction zone; said second component being present in said reaction mixture in the amount of within the range of between about 0.15 and 0.30 moles per liter of said reaction mixture; exposing said reaction zone to a source of radiation energy at the rate of 1 million-electron volt for 1,000 seconds effecting decomposition of said liquid ammonia to hydrazine product and H radical, and the reaction of said ammonia derivative with said H radical to produce additional hydrazine product; and withdrawing said hydrazine product from said reaction zone.

10. A method as recited in claim 9, in which said halogen derivative of ammonia is selected from the group consisting of monochloramine, dichloroamine and trichloroamine.

11. A method as recited in claim 9, in which said halogen derivative of ammonia is present in the amount of about 0.23 moles per liter of said reaction mixture.

* * * * *